Aug. 22, 1944. D. G. C. HARE Re. 22,531

METHOD AND APPARATUS FOR MEASURING THICKNESS

Original Filed June 26, 1940 4 Sheets-Sheet 1

DONALD G.C. HARE
INVENTOR

BY R. J. Dearborn
Daniel Stryker

HIS ATTORNEYS

METHOD AND APPARATUS FOR MEASURING THICKNESS

Original Filed June 26, 1940 4 Sheets-Sheet 2

DONALD G.C. HARE
INVENTOR

BY R. J. Dearborn
Daniel Stryker

HIS ATTORNEYS

METHOD AND APPARATUS FOR MEASURING THICKNESS

Original Filed June 26, 1940 4 Sheets-Sheet 3

STANDARD

DONALD G.C. HARE
INVENTOR

BY R J Dearborn
Daniel Stryker
HIS ATTORNEYS

METHOD AND APPARATUS FOR MEASURING THICKNESS

Original Filed June 26, 1940 4 Sheets-Sheet 4

DONALD G.C. HARE
INVENTOR
BY P. J. Dearborn
Daniel Stryker,
HIS ATTORNEYS

Reissued Aug. 22, 1944 Re. 22,531

UNITED STATES PATENT OFFICE 22,531

METHOD AND APPARATUS FOR MEASURING THICKNESS

Donald G. C. Hare, Roslyn, N. Y., assignor, by mesne assignments, to The Texas Company, New York, N. Y., a corporation of Delaware Original No. 2,277,756, dated March 31, 1942, Serial No. 342,422, June 26, 1940. Application for reissue April 22, 1944, Serial No. 532,318

10 Claims. (Cl. 250—83.6)

This invention relates to the measurement of thickness and particularly to a method and an apparatus for measuring the thickness of the walls of receptacles or pipes adapted to contain or conduct liquids, such, for instance, as the shells of oil stills or the walls of tubes adapted to carry hydrocarbon oil through a heater.

The primary object of the invention is to provide a device which can be used for accurately determining the thickness of a wall from one side only without any necessity for obtaining access to the other side of the wall, and with which measurements can be made at a greater speed than has formerly been possible.

The methods of measuring the thickness of such materials as boiler or tubing walls may be arbitrarily separated into two groups; those which require access to both sides of the wall to be measured, and those requiring access to only one side. Into the former group fall such methods as one type of calipering, examination by means of X-rays or gamma rays transmitted by the material, and certain types of magnetic and electrical methods.

The second group includes magnetic and electrical methods and those methods based upon the assumption that the condition of the surface of the wall not accessible, is known. In this latter sub-group are included the calipering of the inside or outside of pipes or tubing, and the visual examination of the inside of tubing by means of special optical instruments. Also to be included is the aural method, whereby the thickness is determined by the characteristic sound or tone created by a tapping on the material with a suitable hammer. Since in most cases of primary interest it is not economically feasible to have access to both sides of the material to be measured, the first group of methods will not be discussed.

Certain inherent weaknesses in the methods of the prior art may be pointed out. The electrical methods are primarily those which measure the resistance of a portion of the wall under test. Since most materials to be measured are metallic conductors, they possess a relatively high conductivity or low resistance. Thus, if a precise measurement is desired, it is necessary to measure a small difference in a very low resistance, a procedure difficult to do even in a laboratory. In the magnetic method, use is made of either the permeability of the specimen, or of eddy currents generated in the specimen. These methods yield precise results only for very thin specimens, because of the very great effect of the "surface" layers of the material. However, the most serious difficulty with both electric and magnetic methods is that both depend to a large extent on the condition of strain and temperature of the material, and, particularly for the magnetic case, upon the physical history of the specimen. The effects due to these factors are not, as a rule, regular, and in fact may be abrupt and very large.

If the interior of the tubing is accessible, one may determine the average wall thickness, as well as the presence of pitting, by suitable inside calipers, on the assumption that the condition of the inaccessible wall is known. However, no inside caliper measurement can detect a non-concentric bore, i. e., one in which the inner and outer wall surfaces, though circular, are not concentric, thus making one part of the wall thin compared to the average wall thickness. This average thickness will be the thickness determined by caliper measurements, and may be such that the wall thickness is apparently well within the safety limits, when in fact one portion of the wall may be dangerously thin. Such cases are not rare, and in more than one instance the result has been that tubing which when calipered appeared safe and was noted as such, has later ruptured, with resulting disastrous fires.

The optical examination of tubing interiors has considerable value in detecting severe pitting due to corrosion or abrasion. The apparatus is, however, not convenient to use in any but the most ideally disposed tubing, and will yield little or no information regarding the uniform thinning of the walls.

The aural method, when used by a well trained expert, seems to be capable of a good degree of accuracy, particularly for such materials as boiler or tank shells. However, the relative number of cases to which this method may be applied is not large, and there is a most natural indisposition to the trusting of the welfare of workers as well as of the investment in a method so patently dependent upon a highly conditioned human reaction.

This invention comprises a new method and an apparatus capable of measuring to a very high degree of precision the thickness of tubing or boiler walls, or other similar shells. The measurement requires access to only one side of the wall, and yields information regarding the condition of both sides. It may be used either inside or outside the tubing or other equipment or fixture, and will work on non-metals as well as on metals. Its operation can be made reasonably rapid—certainly as fast as the present calipering methods—and is quite independent of the physical history of the material, as well as of its present state of stress and strain. It can also be adapted for use on elbows and bends of tubing.

In accordance with the invention, a device is provided having a casing which is adapted to be placed in contact with the surface of the plate or tube wall to be measured. A source or sources of penetrating radiation is housed within the casing in such a manner that the radiation will be preferably confined so as to be directed angularly toward the surface of the wall. A device adapted to detect radiation which has been scattered and diffusely reflected within and by the material of the wall is associated with the casing and so positioned that it will intercept some of the radiation so scattered and returned outwardly of the wall. The detecting device is preferably connected to a suitable instrument which can if desired be calibrated to read directly the thickness of the wall being measured.

For a better understanding of the invention, reference may be had to the accompanying drawings in which—

Briefly, this invention is based upon the well known physical principle that any radiation having the properties of an electromagnetic wave such as visible light, X-rays, gamma rays, and the like passing through matter will be scattered (a process similar to diffuse reflection, such as the diffusion of light in a fog), and the amount of radiation scattered will increase with the amount of matter traversed. Thus, for example, if one directs a beam of penetrating radiation such as gamma rays upon a sheet of metal, a certain intensity will be scattered in all directions, and one may even detect intensity scattered back toward the source of the incident beam. Further, it will be shown that this scattered intensity will increase with the amount of material traversed by the incident radiation; in this case, with the thickness of the metal sheet. The following discussion, based upon elementary classical theory, will demonstrate this principle.

Figure 1:
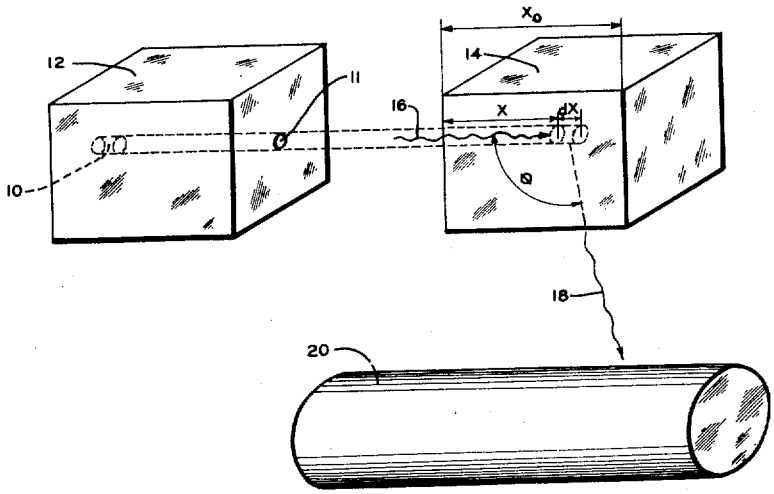
Figure 1 is a diagrammatic illustration of the principles embodied in the invention.

Referring to Figure 1, 10 represents a source of penetrating rays, such as those gamma rays which are emitted by the elements of the radium, actinium or thorium series. This source is placed in a block 12 of material such as lead, which will strongly absorb the emitted rays, so that practically the only radiation from 10 which appears outside the block is the narrow pencil of parallel rays which pass through the hole 11 shown in block 12. This collimated beam impinges on and penetrates a block 14, which may be of any material. It is well known to those versed in the art that when any electromagnetic radiation traverses matter, it will, on the classical theory, set into forced vibration the electrons of the matter traversed, and that these electrons, being subject to periodic accelerations, will themselves radiate energy. A good treatment of this subject based upon classical consideration, is given by J. J. Thompson, who shows that if the intensity of the incident beam is $I_0$, the intensity, $I_e$, scattered by a single electron is given by $$Ie = I_0 \frac{e^4}{2r^2m^2c^4}(1-\cos^2\theta) \qquad (1)$$

where $e$=charge of electron
$r$=distance from scattering electron to point of observation
$m$=mass of electron
$c$=velocity of light
$\theta$=angle between incident and scattered ray If we have a small volume of scatterer containing a number of electrons $dn$, then, assuming that the electrons scatter independently, the scattered intensity $dI_s$ is $$dI_s = I_0 \frac{e^4}{2r^2m^2c^4}(1-\cos^2\theta)\,dn \qquad (2)$$

In any uniform material the electron density, i. e., the number of electrons per unit volume is a constant; hence, from (2) we see that the scattered intensity is proportional to the amount of scatterer irradiated by the primary or incident beam. This assumes that neither the incident nor the scattered beam is absorbed in the scattering material—which is, of course, not true. However, we can, for the purpose of exposition of the method, neglect this factor, as it can be shown, by a treatment beyond the scope of this disclosure, that, for reasonable thickness of scatterers, the effect of absorption may be made of minor importance by suitable geometrical consideration.

Referring again to Figure 1, we have here shown a primary ray or quantum 16, incident on a volume of scatterer whose cross section is that of the collimated beam and whose length is $dx$. A scattered quantum 18 is shown incident on the detector 20, which is some device such as a Geiger-Muller tube, ionization chamber, or photosensitive plate, which will detect the presence of radiation of the nature of that emitted by source 10 and scattered in block 14. Such devices are, when coupled with the proper associated apparatus, commonly capable of determining the number of quanta incident per unit time, i. e., the intensity of the radiation incident upon them.

If we assume that the element of volume whose length is $dx$ contains a number of electrons $dn$, the total scattered from this volume will be given by (2). Further, if $x$ is reasonably small compared to the length of detector 28, the intensity received by 28 will be, to a very good approximation, independent of the $x$ position of $dx$. Now the volume of the scattering element of volume is $kdx$, where $k$ is the cross-section of the incident beam. Then we may write from (2)

$$dI_D = \frac{e^4}{2r^2m^2c^4}(1-\cos^2\theta)k'kdx \qquad (3)$$

where $I_D$=intensity incident on detector 28

$k'$=a constant dependent on the electron density of block 14 and on the geometric relation of the block and the detector 28

Integrating (3) over $x$ from $x=0$ to $x=x_0$ $$I_D = \frac{kk'e^4}{2r^2m^2c^4}(1-\cos^2\theta)x_0 \qquad (4)$$

We thus see that, with certain elementary assumptions, the intensity of scattered radiation as detected by a detector 28 is proportional to the thickness of the scattering material. It is obvious that the detector need not be at 90° to the direction of the incident radiation. It is also obvious that the device need not be arranged so as to give a linear increase in scattered intensity with thickness of scatterer, as long as the actual relationship is known.

It should be emphasized that the elementary classical Equation 1 for scattering does not at all accurately describe the scattering of hard radiation such as gamma rays in so far as intensity and angular distribution is concerned. However, even on the quantum-mechanical basis, the total scattered intensity increases with the amount of scattering material traversed, and the exposition above set forth is qualitatively valid under quantum-mechanical consideration.

Figure 2:
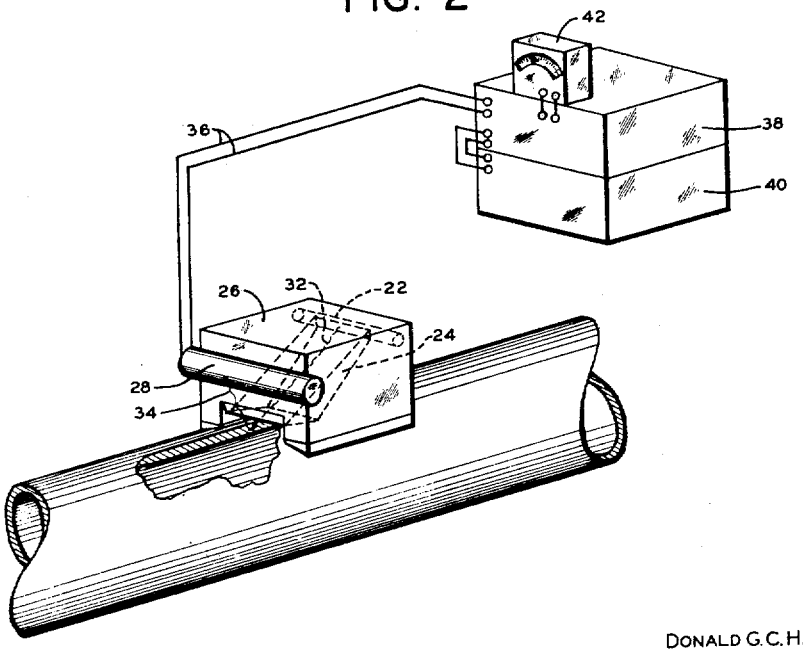
Figure 2 is a perspective view of the device as positioned in contact with the outside of a tube wall for measuring the thickness thereof.
Figure 3:
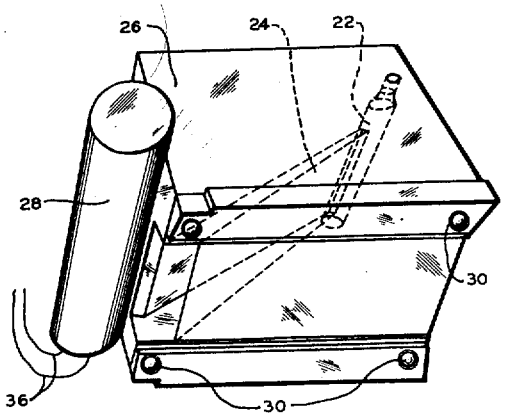
Figure 3 is a bottom perspective view of the device.
Figure 4:
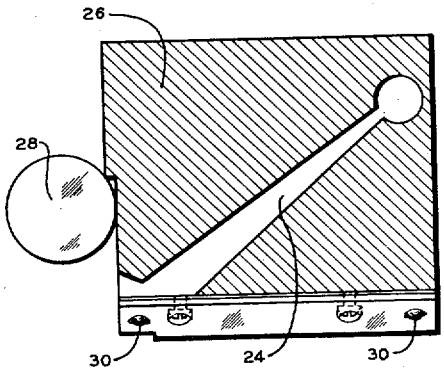
Figure 4 is a sectional elevation through the device.

The device of Figures 2, 3 and 4 is one of many possible arrangements with which to utilize the above principle for making measurements of tubing wall thickness when one has access only to the exterior of the tubing. The source 22 may be, for this arrangement, any suitable radioactive material, such as the elements of the radium, actinium or thorium series, which may emit penetrating gamma rays. Use can also be made of any of the substances normally nonradioactive but which become more or less temporarily radioactive after suitable treatment, such as sodium which has been bombarded by neutrons of suitable energy. The primary or incident radiation is collimated by the slot 24 in the lead block 26, which confines the beam to desired limits. This lead shielding also protects the operator from the harmful effects of radiation of the source. The detector 28 of the scattered radiation may be a Geiger-Muller tube, ionization chamber, or other device suitable for detecting the type of radiation utilized.

The bearings 30 shown are steel balls set in strips of brass or aluminum, which is fastened to the lead block. By using four properly disposed balls the block may be made accurately self-aligning on a pipe, and yet offer small resistance to translatory motion.

Figure 2 shows the block in position on a portion of tubing under examination. In the cutaway section of the wall is depicted an incident quantum 32 and a scattered quantum 34. This figure will make clear that nearly any desired geometrical arrangement can be easily obtained by proper choice of slot and position of detector. The detector 28 is connected electrically by a cable 36 of any convenient length to a direct current amplifier 38. The power for this amplifier as well as the voltage for the ionization chamber or detector 28 is obtained from a suitable battery 40 which may be housed within the casing containing the amplifier 28. The current output of the detector which, as has been described, is a function of the thickness of the wall under examination is amplified and the output of the amplifier 38 is indicated by the reading of the voltmeter 42 shown as connected to the amplifier. Since the indication of this voltmeter then varies as the thickness of the wall being measured, a system is provided which directly indicates the thickness of the specimen under examination.

In Figures 8 through 13 are shown three forms of the device arranged to make measurements of tube wall thickness when access can be had only to the interior of the tube.

Figure 8:
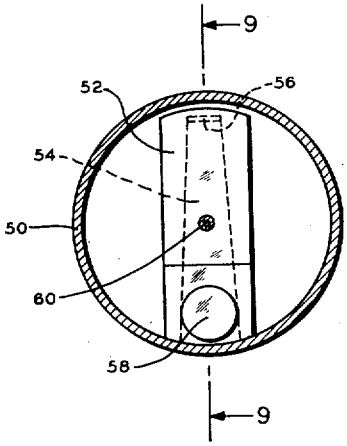
Figure 8 is a sectional elevation through a tube, the thickness of which is to be measured and showing a modified form of the invention.
Figure 9:
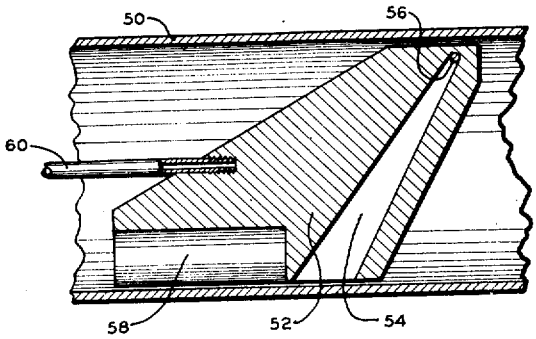
Figure 9 is a side sectional elevation taken on the line 9—9 of Figure 8.

In Figures 8 and 9, a tube 50 is shown, the wall thickness of which it is desired to measure. A lead block or shield member 52 is provided with a slot 54 corresponding to the slot 24 of Figure 2 and at one end of this slot is disposed a source of radiation 56 corresponding to the source 22 of Figure 2. Mounted in the lower portion of the block 52 is a detector 58 of scattered radiation. The device may be placed within and moved through the tube 50 by any suitable means. As shown, the block 52 is attached to the end of a rod or pipe 60 long enough so that the block and its associated elements can be manipulated within the tube. The electrical connections, not shown, from the detector 58 may pass outwardly of the tube through the pipe 60.

The operation of this form of the device is substantially the same as that described with respect to the form shown in Figures 2 through 4. The rays from the source 56 are collimated by means of the slot 54 and enter the wall of the tube 50. Some of the rays scattered in the tube wall then pass to the detector 58 and the response of this detector may be indicated by means of a suitable instrument such as is shown at 38 in Figure 2.

Figure 10:
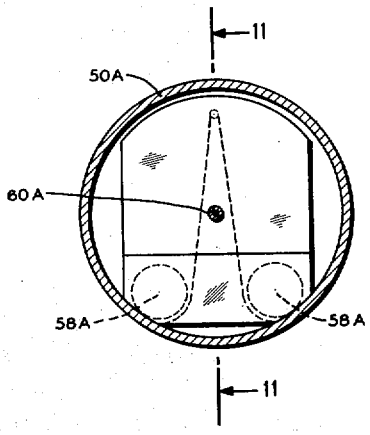
Figure 10 is an elevation through a section of pipe showing another modification of the device.
Figure 11:
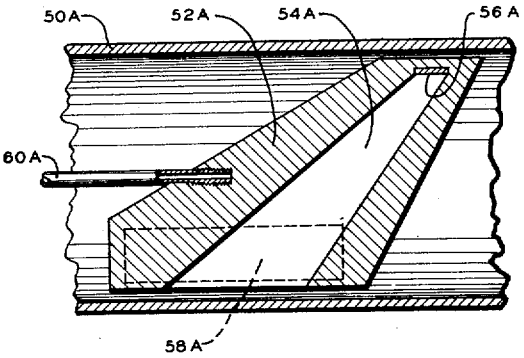
Figure 11 is a side sectional elevation taken on the line 11—11 of Figure 10.

In Figures 10 and 11 is shown another form of the device for use within a tube 50*a*. This device is similar in general to that shown in Figures 8 and 9 and comprises a lead block or shield member 52*a* provided with a slot 54*a*. A source of radiation 56*a* is mounted within the block at one end of the slot. A pair of detectors 58*a* are mounted at opposite sides of the open end of the slot 54*a* and the device is provided with a rod or pipe 60*a* by means of which it may be moved within a tube the walls of which are to be measured. The operation is substantially the same as that described with respect to Figures 8 and 9, the radiation from the source 56*a* entering and being scattered within the wall of the tube 50*a* and some of the scattered radiation being picked up by the detectors 58*a* which are preferably connected electrically with an instrument such as that disclosed at 38 in Figure 2.

Figure 12:
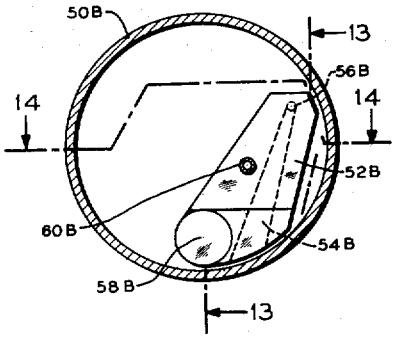
Figure 12 is an elevation through a section of pipe showing still another modification of the invention.
Figure 13:
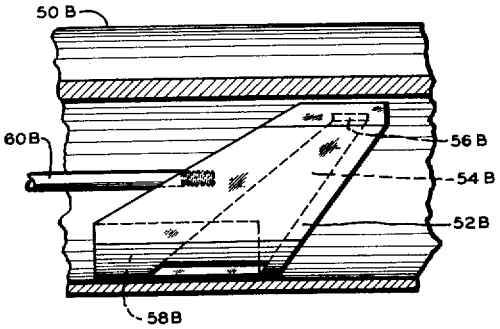
Figure 13 is a side sectional elevation taken on the line 13—13 of Figure 12.
Figure 14:
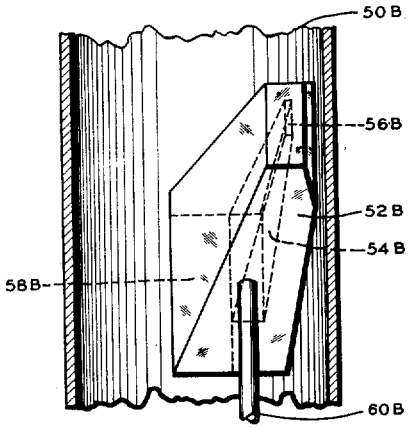
Figure 14 is a sectional plan view taken on the broken line 14—14 of Figure 12.

Still another form of the device for use within a tube or pipe 50*b* is shown in Figures 12, 13 and 14. A lead block or shield member 52*b* is attached at one end of a suitable rod or pipe 60*b* so that it can be moved within the tube 50*b* in contact with the inner surface of the wall thereof. The block 52*b* is provided with a slot 54*b* and at the inner end of the slot is mounted a source of radiation 56*b* similar to the source 22 shown in Figures 2 and 3. The detector 58b is disposed in the block 52b adjacent the open end of the slot 54b and receives radiation from the source 56b which radiation has been scattered within the wall of the tube 50b. As is the case with the forms shown in Figures 8 through 11, the detector 56b is preferably connected electrically by wires, not shown, with an indicating or recording instrument such as is shown at 38 in Figure 2.

Figure 6:
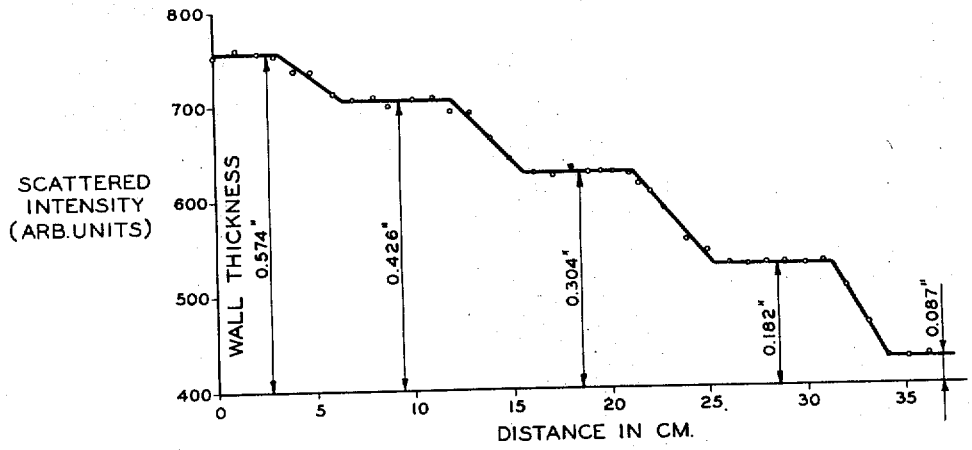
Figure 6 is a curve developed for calibrating the device with a standard pipe.
Figure 7:
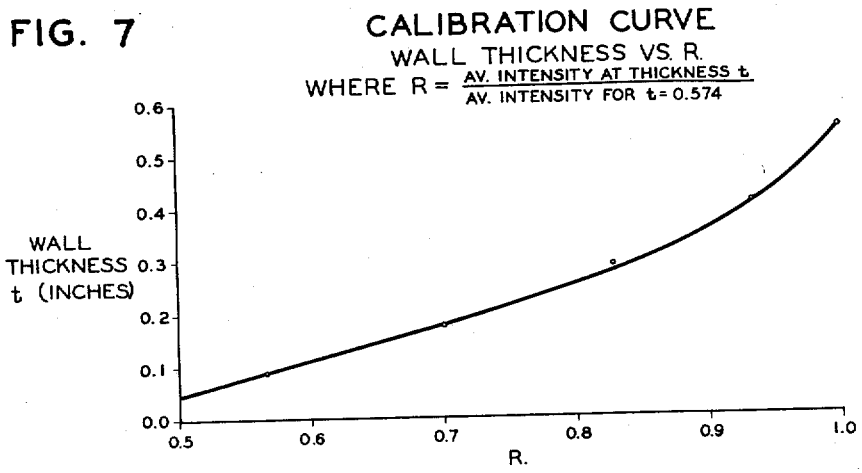
Figure 7 is a curve obtained by comparing intensities due to various thicknesses with the intensity from some arbitrary thickness chosen as a standard.
Figure 5:
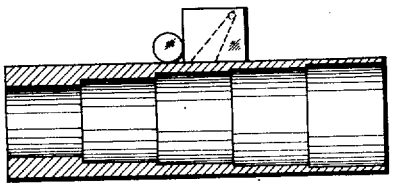
Figure 5 is a diagrammatic illustration of the device as used with a standard for calibration purposes.

While it is possible to calculate the amount of scattering which would be detected from a given wall thickness, this is far from practical in most cases. A more economical procedure is to calibrate the instrument in terms of known tubing thicknesses. This may be done as shown in Figure 5 by placing the device on different tubing thicknesses and plotting the obtained readings as a function of wall thickness. We may thus obtain a curve similar to Figure 6 showing the wall thickness at different distances from the end of the pipe or tube. However, such a graph is a function of both the intensity of the source and the sensitivity of the recording system, and a better calibration curve is one of the type of Figure 7, which is a curve obtained by comparing the intensities due to various thicknesses to the intensity from some arbitrary thickness chosen as a standard. Such a curve is obviously, for a given instrument, independent of the source intensity and recorder sensitivity—at least as long as these factors do not vary during a series of measurements. Having obtained such a calibration curve over the desired range of thicknesses, the intensities recorded on measuring any pipe or tubing will immediately yield the thickness of the wall in terms of the standard thickness. It is in fact easily feasible to calibrate the recorder to give readings directly in terms of thicknesses. One may, of course, use a recording meter which will make a permanent record on, say, a paper strip and this strip may be mechanically coupled to the measuring device so that the motion of the paper corresponds to the motion of the device on the pipe being measured; and the recorded meter deflection on the paper will form a permanent record of the wall thickness at the time of measurement. If it is desired to determine whether the tubing wall may be pitted or otherwise locally thinned, it may be necessary to make measurements at various positions on the circumference, or the device may be made semi-circular or even circular, so as to examine a larger portion of the circumference at one time. It must be pointed out, however, that if the device radiates the entire or major part of the circumference, the possibility of detecting non-concentric bores is reduced.

It is obvious that the method can be made to work equally well inside the tubing, as well as on flat plates or boiler shells. In the case of very small tubes close together, or other cases where the space on either side of the wall is very limited, the source and detector may be separated and used in adjacent tubes, thus determining the sum of the thicknesses of the two tubes. By suitable procedure, the thickness of individual tubes can obviously be calculated.

The incident beam is weakened in traversing the material by the amount that is scattered in all directions, and by the amount absorbed in the material. The scattered intensity is also weakened by absorption as well as by rescattering. These factors set an upper limit on the thickness of any wall which may be accurately determined by this method. This upper limit is almost entirely determined by the penetrating powers or "hardness" of the radiation emitted by the source. Using the gamma rays from radium B and radium C in equilibrium with radium, this limit appears to be from three-quarters to one inch of iron, or somewhat more in lighter materials. However, it is emphasized that this method does not limit itself to the use of gamma rays, but may make use of any radiation or penetrating particles such as X-rays, visible light, alpha and beta particles, neutrons, and the like. In fact, it appears that with the proper use of fast and slow neutrons, the limit of thickness may be increased to as much as three or more inches of iron, thus making possible the measurement of walls of considerable thickness.

While the invention has been described with reference to measuring the thickness of the walls of vessels, tubes or pipes in plants such as oil refineries and the like, it is to be understood that the principles are also applicable to the measuring of the wall thickness of vessels and pipes, such as for instance drill pipe and other tubing to be used in well production.

Obviously, many other modifications and variations of the invention as hereinbefore set forth may be made without departing from the spirit and scope thereof, and therefore only such limitations should be imposed as are indicated by the appended claims.

I claim:

1. The method of measuring the thickness of a wall from one side thereof which comprises directing a beam of penetrative radiation into said wall from one side thereof, and determining from the same side of said wall the amount of radiation scattered in the material of the wall and returned outwardly of said side.

2. The method of measuring the thickness of a plate or of the wall of a tube or the like which comprises passing a beam of penetrative radiation into said wall from one side thereof, and determining the amount of radiation scattered in the material of the wall and returned to a detector on the same side of said wall as the source of radiation, the amount of said returned radiation being proportional to the thickness of said wall.

3. The method of measuring the thickness of a wall from one side thereof which comprises placing a source of penetrative radiation near the surface of said wall so that said radiation enters said wall wherein it is scattered and some of the radiation returned outwardly of said wall, and detecting the amount of said returned radiation by means of a detector placed near said source and at the same side of said wall as said source.

4. The method of measuring the thickness of a wall from one side thereof which comprises directing a beam of penetrative radiation into said wall from one side thereof, intercepting a portion of the radiation scattered in the wall and returned outwardly of said side, directing a similar beam of radiation into another wall of the same material as said first wall and of known thickness, intercepting a portion of the radiation scattered within said last mentioned wall and returned outwardly thereof, and comparing the amounts of radiation intercepted from the two walls.

5. A device for determining the thickness of a wall from one side thereof, comprising a casing adapted to be placed in contact with said side of said wall, a source of penetrative radiation disposed within said casing, means for directing a beam of said radiation from said source to said wall, a detector associated with said casing for intercepting some of said radiation scattered within the material of said wall, a radiation shield member between said source and said detector, and means connected to said detector for indicating the amount of scattered radiation detected.

6. A device for determining the thickness of a wall from one side thereof, comprising a shield member adapted to be placed against one side of said wall, a source of penetrative radiation disposed within said member, said member being provided with a collimating slot for directing a beam of said radiation from said source into said wall, means associated with said shield member for intercepting a portion of the radiation scattered in said wall and means connected with said first means for indicating the amount of scattered radiation intercepted.

7. A device for determining the thickness of a wall from one side thereof, comprising a lead block adapted to be placed against said side of said wall, said block being provided with an opening in the side adjacent the wall, a source of penetrative radiation disposed in said block, said block also being provided with a slot connecting said source with said opening, and a device associated with said block for detecting radiation scattered within said wall near said opening and returned outwardly of said wall at the side where the block is located.

8. A device for determining the thickness of the wall of a tube from the inside thereof, comprising a lead shield member adapted to be placed within and against the inner surface of said tube, a source of penetrative radiation disposed within said member, said member being provided with a slot for directing a beam of said radiation out through said member and into said wall, and means disposed adjacent said member for detecting radiation scattered within said wall and returned through the inner surface thereof.

9. A device for determining the thickness of the wall of a tube from the inside thereof, comprising a lead shield member having a portion conforming to the curvature of the inner surface of said tube and adapted to be placed against said surface, said portion being provided with an opening adapted to be adjacent said inner surface when the device is in operating position, a source of penetrative radiation mounted within said member, said member being provided with a collimating slot for directing a beam of radiation from said source to said opening and into said wall, and a detector disposed near said member for intercepting radiation scattered in said wall and returned to the detector through said inner surface.

10. A device for determining the thickness of the wall of a tube from the inside thereof, comprising a lead shield member adapted to be placed within and against the inner surface of said tube, a source of penetrative radiation disposed within said member, said member being provided with a slot for directing a beam of said radiation out through said member and into said wall, and means disposed adjacent said member for detecting radiation scattered within said wall and returned through the inner surface thereof, means attached to said shield member whereby it can be moved through said tube and an instrument connected to said detecting means for indicating the amount of radiation detected.

DONALD G. C. HARE.